United States Patent
Yagita et al.

(10) Patent No.: US 9,611,161 B2
(45) Date of Patent: Apr. 4, 2017

(54) CIRCULATING WATER UTILIZATION SYSTEM

(71) Applicant: MITSUBISHI HITACHI POWER SYSTEMS, LTD., Yokohama-shi, Kanagawa (JP)

(72) Inventors: Hiroyuki Yagita, Tokyo (JP); Junichi Minamiura, Tokyo (JP); Jun Hyodo, Tokyo (JP); Yukinobu Yokota, Tokyo (JP); Hayato Shin, Tokyo (JP); Riki Kitagawa, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 15/100,849

(22) PCT Filed: Dec. 4, 2014

(86) PCT No.: PCT/JP2014/082096
§ 371 (c)(1),
(2) Date: Jun. 1, 2016

(87) PCT Pub. No.: WO2015/083784
PCT Pub. Date: Jun. 11, 2015

(65) Prior Publication Data
US 2016/0368802 A1    Dec. 22, 2016

(30) Foreign Application Priority Data
Dec. 5, 2013    (JP) .................................. 2013-251621

(51) Int. Cl.
*C02F 1/32* (2006.01)
*C02F 9/00* (2006.01)
(Continued)

(52) U.S. Cl.
CPC .............. *C02F 9/00* (2013.01); *C02F 1/008* (2013.01); *C02F 1/02* (2013.01); *C02F 1/325* (2013.01);
(Continued)

(58) Field of Classification Search
CPC .... C02F 1/004; C02F 1/38; C02F 1/32; C02F 2303/12; C02F 2103/002; C02F 2209/40;
(Continued)

(56) References Cited

U.S. PATENT DOCUMENTS 8,216,455 B1 *    7/2012  O'Brien ................... C02F 1/30
                                                            137/236.1
2004/0144704 A1 *  7/2004  Johnson ................... C02F 9/00
                                                            210/170.03

FOREIGN PATENT DOCUMENTS

JP    S61-230707 A    10/1986
JP    S63-119892 A     5/1988
(Continued)

OTHER PUBLICATIONS

Notice of Allowance of counterpart Japanese Application No. 2013-251620, dated Feb. 25, 2016, with English translation. (6 pages) (U.S. Appl. No. 15/100,865).
(Continued)

*Primary Examiner* — Walter D Griffin
*Assistant Examiner* — Cameron Allen
(74) *Attorney, Agent, or Firm* — Westerman, Hattori, Daniels & Adrian, LLP

(57) ABSTRACT

A circulating-water utilization system (1) to be constructed in a specific area includes; a circulation channel (2) having a closed loop shape through which circulating water flows; a discharge channel (4) through which wastewater discharged from a water consumer (3) is discharged to the circulation channel (2), the water consumer (3) being com-
(Continued)

posed of water consuming members; a purifying unit (8) configured to purify the circulating water containing the wastewater flowing through the circulation channel (2); a supply channel (6) configured to supply the circulating water purified by the purifying unit (8) to the water consumer (3); water intake parts (10) for intake of the circulating water from the supply channel (6), disposed on the respective water consuming members; and sterilizing units (11) disposed on the respective water intake parts (10), and configured to individually sterilize the circulating water to be supplied to the respective water consuming members.

7 Claims, 5 Drawing Sheets

(51) Int. Cl.
    *C02F 1/00*     (2006.01)
    *C02F 1/02*     (2006.01)
    *C02F 1/78*     (2006.01)
    *C02F 1/42*     (2006.01)
    *C02F 1/44*     (2006.01)
    *C02F 3/30*     (2006.01)
    *E03B 1/04*     (2006.01)
    C02F 103/00     (2006.01)

(52) U.S. Cl.
    CPC .................. *C02F 1/42* (2013.01); *C02F 1/44* (2013.01); *C02F 1/78* (2013.01); *C02F 3/30* (2013.01); *E03B 1/042* (2013.01); C02F 2103/002 (2013.01); C02F 2209/44 (2013.01); C02F 2301/046 (2013.01); C02F 2303/04 (2013.01); C02F 2307/10 (2013.01); C02F 2307/14 (2013.01); E03B 2001/045 (2013.01)

(58) Field of Classification Search
    CPC .......... C02F 2209/42; C02F 1/76; C02F 1/68; B01D 24/12; B01D 24/38; B01D 35/30
    See application file for complete search history.

(56) References Cited

FOREIGN PATENT DOCUMENTS

| | | |
|---|---|---|
| JP | H06-79142 A | 3/1994 |
| JP | H06-210291 A | 8/1994 |
| JP | H06-226059 A | 8/1994 |
| JP | H06-240711 A | 8/1994 |
| JP | H06-269766 A | 9/1994 |
| JP | H06-277455 A | 10/1994 |
| JP | 06-77886 U | 11/1994 |
| JP | H07-68257 A | 3/1995 |
| JP | 7-251186 A | 10/1995 |
| JP | 08-19773 A | 1/1996 |
| JP | H08-229590 A | 9/1996 |
| JP | H09-296493 A | 11/1997 |
| JP | H10-33953 A | 2/1998 |
| JP | H10-57941 A | 3/1998 |
| JP | 10-286033 A | 10/1998 |
| JP | 11-090464 A | 4/1999 |
| JP | H11-114551 A | 4/1999 |
| JP | H11-207155 A | 8/1999 |
| JP | H11-220155 A | 8/1999 |
| JP | 2000-288570 A | 10/2000 |
| JP | 2001-170458 A | 6/2001 |
| JP | 2002-045872 A | 2/2002 |
| JP | 2002-166263 A | 6/2002 |
| JP | 2002-210335 A | 7/2002 |
| JP | 2002-215731 A | 8/2002 |
| JP | 2002-267657 A | 9/2002 |
| JP | 2002-316143 A | 10/2002 |
| JP | 2003-019491 A | 1/2003 |
| JP | 2003-075209 A | 3/2003 |
| JP | 2003-088891 A | 3/2003 |
| JP | 2003-178155 A | 6/2003 |
| JP | 2003-519552 A | 6/2003 |
| JP | 2004-008958 A | 1/2004 |
| JP | 2004-038902 A | 2/2004 |
| JP | 2004-041887 A | 2/2004 |
| JP | 2004-141846 A | 5/2004 |
| JP | 2004-249174 A | 9/2004 |
| JP | 2004-290719 A | 10/2004 |
| JP | 2005-149003 A | 6/2005 |
| JP | 2005-186960 A | 7/2005 |
| JP | 2006-051477 A | 2/2006 |
| JP | 2006-223935 A | 8/2006 |
| JP | 2006-233779 A | 9/2006 |
| JP | 2006-281074 A | 10/2006 |
| JP | 2006-281159 A | 10/2006 |
| JP | 06-302049 A | 11/2006 |
| JP | 2006-302049 A | 11/2006 |
| JP | 2006-305499 A | 11/2006 |
| JP | 2006-310209 A | 11/2006 |
| JP | 2007-185648 A | 7/2007 |
| JP | 2008-307503 A | 12/2008 |
| JP | 2009-073763 A | 4/2009 |
| JP | 2009-124800 A | 6/2009 |
| JP | 2009-153784 A | 7/2009 |
| JP | 2010-120015 A | 6/2010 |
| JP | 2010-188344 A | 9/2010 |
| JP | 2010-253355 A | 11/2010 |
| JP | 2010-538823 A | 12/2010 |
| JP | 4611120 B2 | 1/2011 |
| JP | 2011-078979 A | 4/2011 |
| JP | 2011-152544 A | 8/2011 |
| JP | 2011-189253 A | 9/2011 |
| JP | 2012-092579 A | 5/2012 |
| JP | 2012-106198 A | 6/2012 |
| JP | 5116986 B2 | 1/2013 |
| JP | 2013-034926 A | 2/2013 |
| JP | 2013-043153 A | 3/2013 |
| JP | 2013-188710 A | 9/2013 |
| WO | 2013/176119 A1 | 11/2013 |

OTHER PUBLICATIONS

Notice of Allowance of counterpart Japanese Application No. 2013-251621, dated May 23, 2014, with English translation. (6 pages).
Notice of Allowance of counterpart Japanese Application No. 2013-251622, dated Mar. 24, 2014, with English translation. (6 pages). (U.S. Appl. No. 15/037,601).
Notification of Transmittal of Translation of the International Preliminary Report on Patentability (Form PCT/IB/338) of International Application No. PCT/JP2014/082082 dated Jun. 16, 2016, with Forms PCT/IB/373 and PCT/ISA/237. (11 pages).
International Search Report dated Jan. 13, 2015, issued in counterpart International Application No. PCT/JP2014/082082. (8 pages).
Decision to Grant a Patent dated May 7, 2014, issued in counterpart Japanese Patent Application No. 2013-251625, with English translation, (6 pages).
Office Action dated Feb. 12, 2014, issued in counterpart Japanese Patent Application No. 2013-251630, with English translation. (7 pages).
Decision to Grant a Patent dated May 7, 2014, issued in counterpart Japanese Patent Application No. 2013-251630, with English translation. (6 pages).
International Search Report dated Jan. 13, 2015, issued in counterpart International Application No. PCT/JP2014/082079. (8 pages).
Notification of Transmittal of Translation of the International Preliminary Report on Patentability (Form PCT/IB/338) of International Application No. PCT/JP2014/052079 dated Jun. 16, 2016, with Forms PCT/IB/373 and PCT/ISA/237. (13 pages).
Decision to Grant a Patent dated Mar. 4, 2014, issued in counterpart Japanese Patent Application No. 2013-251627, with English translation. (6 pages).
International Search Report dated Jan. 13, 2015, issued in counterpart International Application No. PCT/JP2014/082080. (7 pages).

(56) References Cited

OTHER PUBLICATIONS

Notification of Transmittal of Translation of the International Preliminary Report on Patentability (Form PCT/IB/338) of International Application No. PCT/JP2014/082080 dated Jun. 16, 2016, with Forms PCT/IB/373 and PCT/ISA/237. (11 pages).
Decision to Grant a Patent dated May 23, 2014, issued in counterpart Japanese Patent Application No, 2013-251626, with English translation. (6 pages).
International Search Report dated Jan. 13, 2015, issued in counterpart International Application No. PCT/JP2014/082081. (9 pages).
Notification of Transmittal of Translation of the International Preliminary Report on Patentability (Form PCT/IB/338) of International Application No. PCT/JP2014/082081 dated Jun. 16, 2016, with Forms PCT/IB/373 and PCT/ISA/237. (15 pages).
International Search Report dated Jan. 13, 2015, issued in counterpart International Application No. PCT/JP2014/082083 (7 pages).
Notification of Transmittal of Translation of the International Preliminary Report on Patentability (Form PCT/IB/338) of International Application No. PCT/JP2014/082083 dated Jun. 16, 2016, with Forms PCT/IB/373 and PCT/ISA/237. (11 pages).
Decision to Grant a Patent dated Feb. 25, 2014, issued in counterpart Japanese Patent Application No. 2013-251624, with English translation. (6 pages).
International Search Report dated Jan. 20, 2015, issued in counterpart International Application No. PCT/JP2014/082093 (7 pages).
Notification of Transmittal of Translation of the International Preliminary Report on Patentability (Form PCT/IB/338) of International Application No. PCT/JP2014/082093 dated Jun. 16, 2016, with Forms PCT/IB/373 and PCT/ISA/237. (11 pages).
Decision to Grant a Patent dated Mar. 4, 2014, issued in counterpart Japanese Patent Application No. 2013-251623, with English translation. (6 pages).
International Search Report dated Feb. 24, 2015, issued in International App. No, PCT/JP2014/082095. (12 pages).
Notification of Transmittal of Translation of the International Preliminary Report on Patentability (Form PCT/IB/338) of International Application No. PCT/JP2014/082095 dated Jun. 16, 2016, with Forms PCT/IB/373 and PCT/ISA/237. (22 pages).
Decision to Grant a Patent dated Aug. 1, 2014, issued in counterpart Japanese Patent Application No, 2013-251629, with English translation. (6 pages).
International Search Report dated Sep. 10, 2013, issued in International App. No. PCT/JP2013/068920. (7 pages).
Notification of Transmittal of Translation of the International Preliminary Report on Patentability (Form PCT/IB/338) of International Application No. PCT/JP2013/068920 dated Sep. 10, 2013, with Forms PCT/IB/373 and PCT/ISA/237. (10 pages).
Decision to Grant a Patent dated Aug. 12, 2013, issued in counterpart Japanese Patent Application No. 2013-143842, with English translation. (6 pages).
International Search Report dated Sep. 10, 2013, issued in International App. No. PCT/JP2013/068923. (7 pages).
Notification of Transmittal of Translation of the International Preliminary Report on Patentability (Form PCT/IB/338) of International Application No. PCT/JP2013/068923 dated Jan. 12, 2016, with Forms PCT/IB/373 and PCT/ISA/237. (10 pages).
Decision to Grant a Patent dated Aug. 12, 2013, issued in counterpart Japanese Patent Application No. 2013-143843, with English translation. (6 pages).
"Ministry of the Environment", Manual for Industrial Wastewater Treatment Technology Transfer 2002, Mar. 2003, with a concise explanation of the relevance, (133 pages).
Japan Patent Office, Hyojun Gijutsushu (Mizu Shori Gijutsu), May 12, 2006, pp. 94-95.
Notification of Transmittal of Translation of the International Preliminary Report on Patentability (Form PCT/IB/338) of International Application No. PCT/JP2014/082078 dated Jun. 16, 2016, with Forms PCT/IB/373 and PCT/ISA/237. (11 pages).
International Search Report dated Feb. 10, 2015, issued in International App. No. PCT/JP2014/082078. (8 pages).
Decision to Grant a Patent dated Mar. 4, 2014, issued in counterpart Japanese Patent Application No. 2013-251628, with English translation. (6 pages).
International Search Report dated Jan. 20, 2015, issued in counterpart International Application No. PCT/JP2014/082094, with partial translation. (8 pages). (U.S. Appl. No. 15/037,601).
Office Action dated Mar. 4, 2014, issued in counterpart Japanese Patent Application No. 2013-251621, with English translation. (5 pages), (U.S. Appl. No. 15/100,849).
International Search Report dated Jan. 27, 2015, issued in International Patent Application No. PCT/JP2014/082096. (9 pages), (U.S. Appl. No. 15/100,849).
Notification of Transmittal of Translation of the International Preliminary Report on Patentability (Form PCT/IB/338) of International Application No. PCT/JP2014/082096 dated Jun. 16, 2016, with Forms PCT/IB/373 and PCT/ISA/237. (13 pages) (U.S. Appl. No. 15/100,849).
Translation of Notification of Transmittal of Translation of the International Preliminary Report on Patentability (Form PCT/IB/338) of International Application No. PCT/JP2014/082097 dated Jun. 16, 2016, with Forms PCT/IB/373 and PCT/ISA/237. (15 pages), (U.S. Appl. No. 15/100,884).
International Search Report dated Feb. 10, 2015, issued in International Patent Application No. PCT/JP2014/082098. (7 pages).
Notice of Allowance of counterpart Japanese Application No. 2013-251619, dated May 16, 2014, with English translation. (6 pages). (U.S. Appl. No. 15/100,884).
Notice of Allowance of counterpart Japanese Application No. 2013-251620, dated Mar. 4, 2016, with English translation. (6 pages).
Notice of Allowance of counterpart Japanese Appiication No. 2013-251621, dated Feb. 25, 2014, with English translation. (6 pages). (U.S. Appl. No. 15/100,849).
Translation of Notification of Transmittal of Translation of the International Preliminary Report on Patentability (Form PCT/IB/338) of Internationai Application No. PCT/JP2014/082094, dated Jun. 16, 2016, with Forms PCT/IB/373 and PCT/ISA/237. (11 pages). (U.S. Appl. No. 15/037,601).
Notice of Allowance of counterpart Japanese Application No. 2013-251622, dated May 23, 2014, with English translation. (6 pages). (U.S. Appl. No. 15/037,601).
Translation of Notification of Translation of the International Preliminary Report on Patentability (Form PCT/IB/338) of Internationai Application No. PCT/JP2014/082098 dated Jun. 16, 2016, with Forms PCT/IB/373 and PCT/ISA/237. (11 pages).
International Search Report dated Feb. 10, 2015, issued in International Patent Application No. PCT/JP2014/082097. (8 pages). (U.S. Appl. No. 15/100,884).

\* cited by examiner

CIRCULATING WATER UTILIZATION SYSTEM

TECHNICAL FIELD

The present disclosure relates to a circulating water utilization system to be constructed in a specific area separately from a public waterworks system.

BACKGROUND ART

To make the most of limited water resources, a system for purifying and re-utilizing wastewater discharged from buildings, residences, and the like has been known. For instance, Patent Document 1 discloses a wastewater re-utilization system configured to use drainage of clean water used in a household or the like and rainwater for flushing toilets, for instance, whereby it is possible to save water. Further, Patent Document 2 discloses an interior greening system for utilizing gray water, which produces gray water by processing wastewater from a building and re-utilizes the produced gray water to water plants which are grown inside a building.

CITATION LIST

Patent Literature

Patent Document 1: JPH8-19773A
Patent Document 2: JPH10-286033A

SUMMARY

Problems to be Solved

Meanwhile, the applicant is developing a novel circulating-water utilization system having a totally different scale flour that of the above described typical re-utilization systems.

The above described typical re-utilization systems are fundamentally intended to purify wastewater of clean water supplied from a waterworks system to utilize the wastewater as gay water for as specific usage in a single building or a single household, for instance, and the used gay water is discharged to a sewerage system In other won* the typical systems require existing public waterworks systems and sewerage systems as a premise, and cannot replace the existing systems.

In contrast, the novel circulating-water utilization system that the applicant is now working on is, as described in detail below a system that provides a service of processing clean water and sewage integrally for an area or a complex inhabited by as many as ten thousand people. In the area or the complex, water is supplied and processed in circulation. In other words, this circulating-water utilization system is designed to be supplied with water from a waterworks system only for drinking purpose for a while, and provided fundamentally as a small distributed system of processing clean water and sewage integrally, constructed independently from existing waterworks systems and sewerage systems.

In development of such a novel circulating-water utilization system, approaches have been sought to enhance users' trust on the quality of circulating water produced by purifying wastewater.

At least one embodiment of the present invention was made in view of the above typical problem, and an object of the at least one embodiment is to provide a novel circulating-water utilization system whereby it is possible to enhance users' trust on the quality of circulating water.

Solution to the Problems

A circulating-water utilization system according to at least one embodiment of the present invention comprises: a circulation channel through which circulating water flows; a discharge channel through which wastewater discharged from a water consumer is discharged to the circulation channel, the water consumer being composed of a plurality of water consuming members including at least one of a residence, a tenant shop, or an office which uses the circulating water flowing through the circulating channel; a purifying unit configured to purify the circulating water containing the wastewater flowing through the circulation channel; a supply channel configured to supply the circulating water purified by the purifying unit to the water consumer; a plurality of water intake parts for intake of the circulating water from the supply channel, the water intake parts being disposed on the respective water consuming members; and a plurality of sterilizing units disposed on the respective water intake parts, and configured to individually sterilize the circulating water to be supplied to the respective water consuming members.

Circulating water is obtained by purifying wastewater, which is sewage, with a purifying unit. Although the water quality of circulating water is guaranteed to be a predetermined level or higher, some users may feel anxious about the quality of circulating water In this regard, the present circulating-water utilization system comprises the sterilizing unit for sterilizing circulating water, disposed on the intake part for intake of circulating water. Thus, it is possible to sterilize circulating water immediately before the plurality of consuming members, which are users, use the circulating water, and thereby it is possible to enhance users' trust on the circulating water.

In the above embodiment, the sterilizing units are configured to be capable of optionally setting a processing level of sterilization.

According to this embodiment, a user himself/herself can set a sterilizing level optionally, for instance. A user himself/herself can take part in sterilization of circulating water immediately before using the circulating water and can select a level of the sterilization optionally as described above, which makes it possible to enhance users' trust on the circulating water even further.

In the above embodiment, the sterilizing units comprise an ultraviolet sterilizing device including an ultraviolet emitting lamp configured to irradiate the circulating water with ultraviolet, and an irradiation-time setting part capable of optionally setting a duration for which the ultraviolet emitting lamp emits ultraviolet.

According to this embodiment, the sterilizing units include the ultraviolet sterilizing device capable of optionally setting a duration to emit ultraviolet continuously from the ultraviolet emitting lamp. Thus, a user himself/herself can set a duration of ultraviolet irradiation, which is a sterilizing time, optionally. A use himself/herself can take part in sterilization of circulating water immediately before using the circulating water and can select a duration of ultraviolet irradiation optionally as described above, which makes it possible to enhance users trust on the circulating water even further In the above embodiment, the sterilizing units comprise a boiling device including a heating unit configured to heat and boil the circulating water, and a boiling-time setting part capable of optionally setting a boiling time by the heating unit.

According to this embodiment, the sterilizing units include the boiling device capable of optionally setting a duration to boil circulation water. Thus, as user himself/herself can set a boiling time, which is a sterilizing time, optionally. A user himself/herself can take part in sterilization of circulating water immediately before using the circulating water and can select a boiling time optionally as described above, which makes it possible to enhance users' trust on the circulating water even further.

In some embodiments, the sterilizing units are configured to start operation at a predetermined time interval to sterilize the circulating water.

According to this embodiment, sterilization is performed at a preset interval without a user starting the sterilizing units by himself/herself which makes it possible to enhance users' trust on circulating water even further.

In some embodiments, the sterilizing units comprise a water storage tank configured to store the circulating water, and are configured to sterilize the circulating water stored in the water storage tank each time the water storage tank is supplied with the circulating water.

According to this embodiment, circulating water stored in the water reservoir tank for storing circulating water is sterilized each time circulating water is supplied to the water reservoir tank, without a user starting the sterilizing units by himself/herself. Thus, it is possible to enhance users' trust on circulating water even further.

In some embodiments, the supply channel comprises: a supply pipe constituting at least a part of the supply channel and having an inner wall which is mirror-finished; and an ultraviolet emitting unit configured to emit ultraviolet into the supply pipe.

According to this embodiment, ultraviolet is emitted into the supply pipe, and the inner wall obtained by mirror finish is utilized to diffusely reflect ultraviolet inside the supply pipe, which makes it possible to sterilize circulating water that flows through the supply pipe.

In some embodiments, the circulation channel comprises: a circulation pipe constituting at least a part of the circulation channel at a downstream side of the purifying unit and at an upstream side of a connection position at which the circulation channel is connected to the supply pipe and having an inner wall which is minor-finished; and an ultraviolet emitting unit configured to emit ultraviolet into the circulation pipe.

According to this embodiment, ultraviolet is emitted into the circulation pipe, and the inner wall obtained by mirror finish is utilized to diffusely reflect the ultraviolet inside the circulation pipe, which makes it possible to sterilize circulating water that flows through the circulation pipe.

Advantageous Effects

According to at least one embodiment of the present invention, it is possible to provide a novel circulating-water utilization system whereby it is possible to enhance users' trust on the quality of recirculating water.

DETAILED DESCRIPTION

Embodiments of the present invention will now be described in more detail with reference to the accompanying drawings.

However, the scope of the present invention is not limited to the following embodiments. It is intended that dimensions, materials, shapes, relative positions and the like of components described in the embodiments shall be interpreted as illustrative only and not intended to limit the scope of the present invention.

Figure 1:
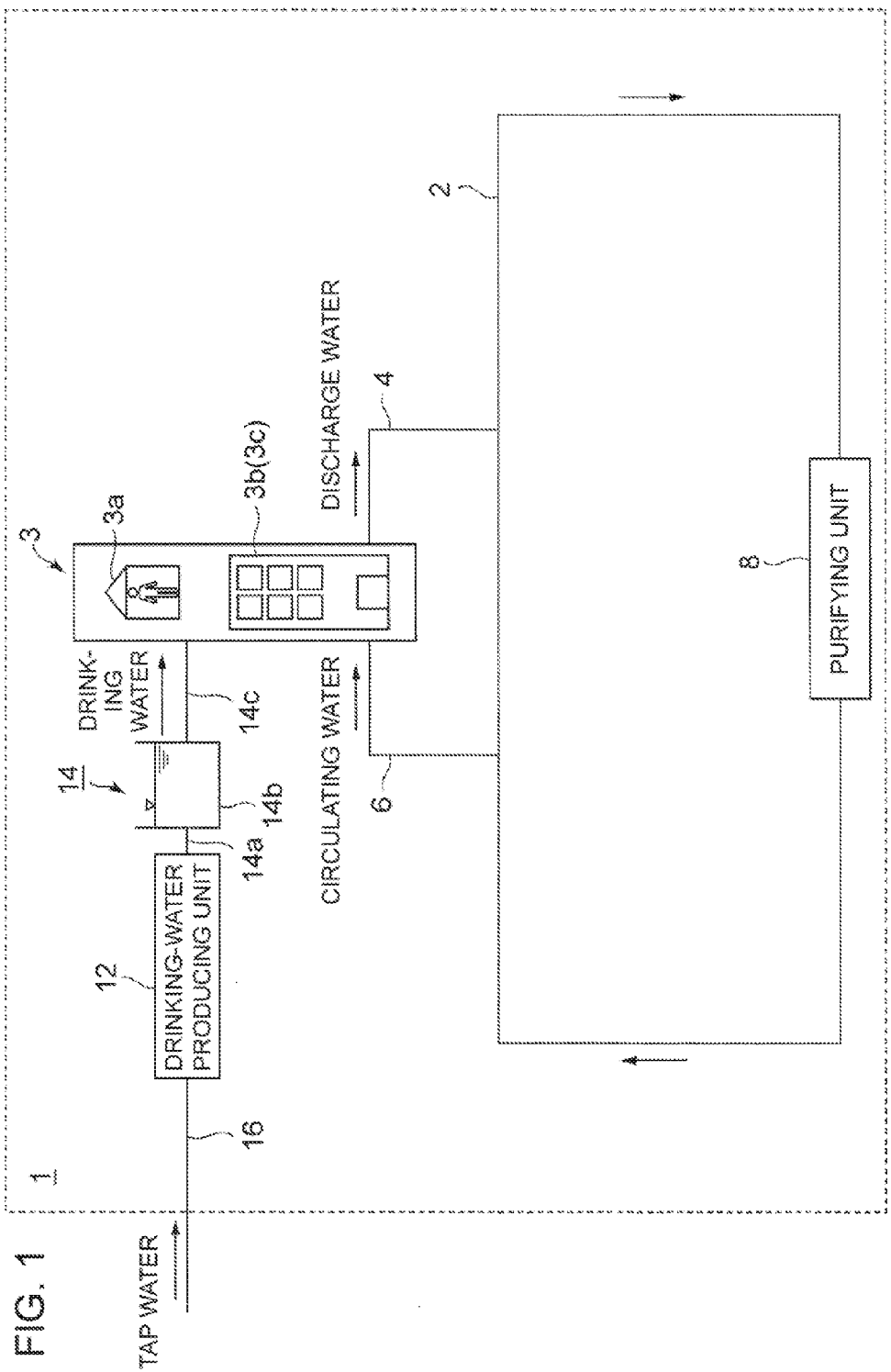
FIG. 1 is an overall schematic diagram of a circulating-water utilization system according to at least one embodiment of the present invention.

FIG. 1 is an overall schematic diagram of a circulating-water utilization system according to at least one embodiment of the present invention.

A circulating-water utilization system 1 is constructed in a specific area separately from a public waterworks system. The present system is designed to be applied to a population of approximately 5,000 to 20,000. An area of application is supposed to be an apartment composed of residences, an office building composed of offices, a commercial facility composed of tenant shops, a complex composed of combination of the above, or the like.

As illustrated in FIG. 1, the circulating-water utilization system 1 includes a circulation channel 2, a water consumer 3, a discharge channel 4, a supply channel 6, a purifying unit 8, a drinking-water producing unit 12, and a drinking-water supply unit 14, for instance.

The circulation channel 2 is configured as a piping network of water pipeline arranged in a closed loop. Various devices such as a pump (not depicted) and as valve (not depicted) are disposed where needed in the circulation channel 2 in accordance with terrain conditions or the like, so that circulating water flows circulating in a direction.

Raw water of circulating water that flows through the circulation channel 2 is not limited to tap water supplied from a public waterworks system, and may be well water, river water, rain water, or desalinated sea water, for instance. Further, if circulating water is insufficient, such raw water may be taken into the circulation channel 2 from outside as makeup water. If raw water is taken into the circulation channel 2 as makeup water, the raw water may be taken into treatment vessels of the purifying unit 8 described below in accordance with the water quality level of the raw water. For instance, well water, river water, and desalinated sea water, which have a relatively high water quality, may be taken into a coarse-membrane container L4 or a fine-membrane container L5 of the purifying unit 8 described below, and rain water with a relatively low water quality may be taken into a permeable container L2 or an aerobic container L3.

The water consumer 3 is a subjective member that utilizes circulating water that flows through the circulation channel 2 as daily life water. The water consumer 3 is composed of a plurality of water consuming members including at least one of a residence 3a, a tenant shop 3b, or an office 3c. A residence 3a refers to a unit of an apartment complex or a stand-along house inhabited by a family. A tenant shop 3b refers to a shop or the like which offers services to the general consumer in a section of a commercial facility. The business category of tenant shops may include, for instance, the retailing business such as clothing stores, grocery stores, drug stores, and alcohol stores, as well as the food-service business such as restaurants, cafes, sushi bars, and pubs. An office 3c refers to a place where employees working at the place do desk work for a certain purpose in a section of an office building, for instance.

In the residence 3a, daily life water is used for shower, bath, washing clothes, washing dishes, washing face and hands, toilet, etc. In the tenant shop 3b, daily water life is used for cleaning, toilet, etc. The amount of water demand is widely varied between different kinds of businesses. For instance, a restaurant uses far more daily life water than a retail store. The office Sc mainly uses daily life water for toilet.

Further, the water consumer 3 is supplied with drinking water separately from the above described circulating water. This drinking water is produced by further purifying tap water introduced from a public waterworks system, and has a quality equivalent to that of mineral waters sold at market. This feature can dissolve anxiety of users who may hesitate to drink circulating water, and is expected to provide a selling point for popularizing the present circulating-water utilization system 1.

Tap water is introduced into the drinking-water producing unit 12 from a public water works system via a tap-water introduction channel 16. The drinking-water producing unit 12 produces drinking water for the water consumer 3 by purifying the introduced tap water. The drinking-water producing unit 12 comprises a container-type treatment vessel including a container that houses a processing device that performs a treatment step consisting a series of purifying steps, similarly to the purifying unit 8 described below. The drinking-water producing unit 12 may comprise a plurality of the container-type treatment vessels connected in series along an order of treatment steps.

In the present specification, a container refers to a box-shaped reservoir whose dimensions are standardized for transportation purpose.

It should be noted that raw water of drinking water in the circulating-water utilization system 1 is not limited to tap water, and may be well water, river water, or desalinated sea water, for instance.

Drinking water produced by the drinking-water producing unit 12 is supplied to each water consuming member by the drinking-water supply unit 14. The drinking-water supply unit 14 comprises a drinking-water feeding channel 14a, a reservoir tank 14b, and a drinking-water channel 14c. Drinking water produced by the drinking-water producing unit 12 is fed to the reservoir tank 14b via the drinking-water feeding channel 14a and stored temporarily in the reservoir tank 14b. The drinking water stored in the reservoir tank 14b is supplied to each of the water consuming members including the above described residence 3a, tenant shop 3b, and office 3c via the drinking-water channel 14c.

The discharge channel 4 is a channel for draining wastewater discharged from the water consumer 3 to the circulation channel 2. Wastewater discharged from the discharge channel 4 includes drinking water and water not from the system, in addition to circulating water having been utilized by the water consumer 3 as daily life water. The supply channel 6 is a channel for supplying circulating water purified by the following purifying unit 8 to the water consumer 3 as daily life water The discharge channel 4 and the supply channel 6 both comprise pipeline. Various devices such as a pump (not depicted) and a valve (not depicted) are disposed where needed in the discharge channel 4 and the supply channel 6 in accordance with terrain conditions or the like, so that wastewater drains to the circulation channel 2, or circulating water is supplied to the water consumer 3.

The purifying unit 8 is a unit to purify circulating water including waste water that flows through the circulation channel 2. The purifying unit 8 comprises a container-type treatment vessel including a container that houses a processing device that performs a treatment step consisting a series of purifying steps. The drinking-water producing unit 12 may comprise a plurality of the container-type treatment vessels connected in series along an order of treatment steps.

Further, in the present circulating-water utilization system 1, the circulation channel 2 is not connected to a public sewerage system. As described below, excess sludge such as sludge cake produced during purification of waste water is carried out of the system, but otherwise wastewater is re-utilized 100%. In other words, the present circulating-water utilization system 1 is a full-circulation type circulating-water utilization system that supplies and processes water in circulation within the system, and does not discharge sewage water out of the system.

Figure 2:
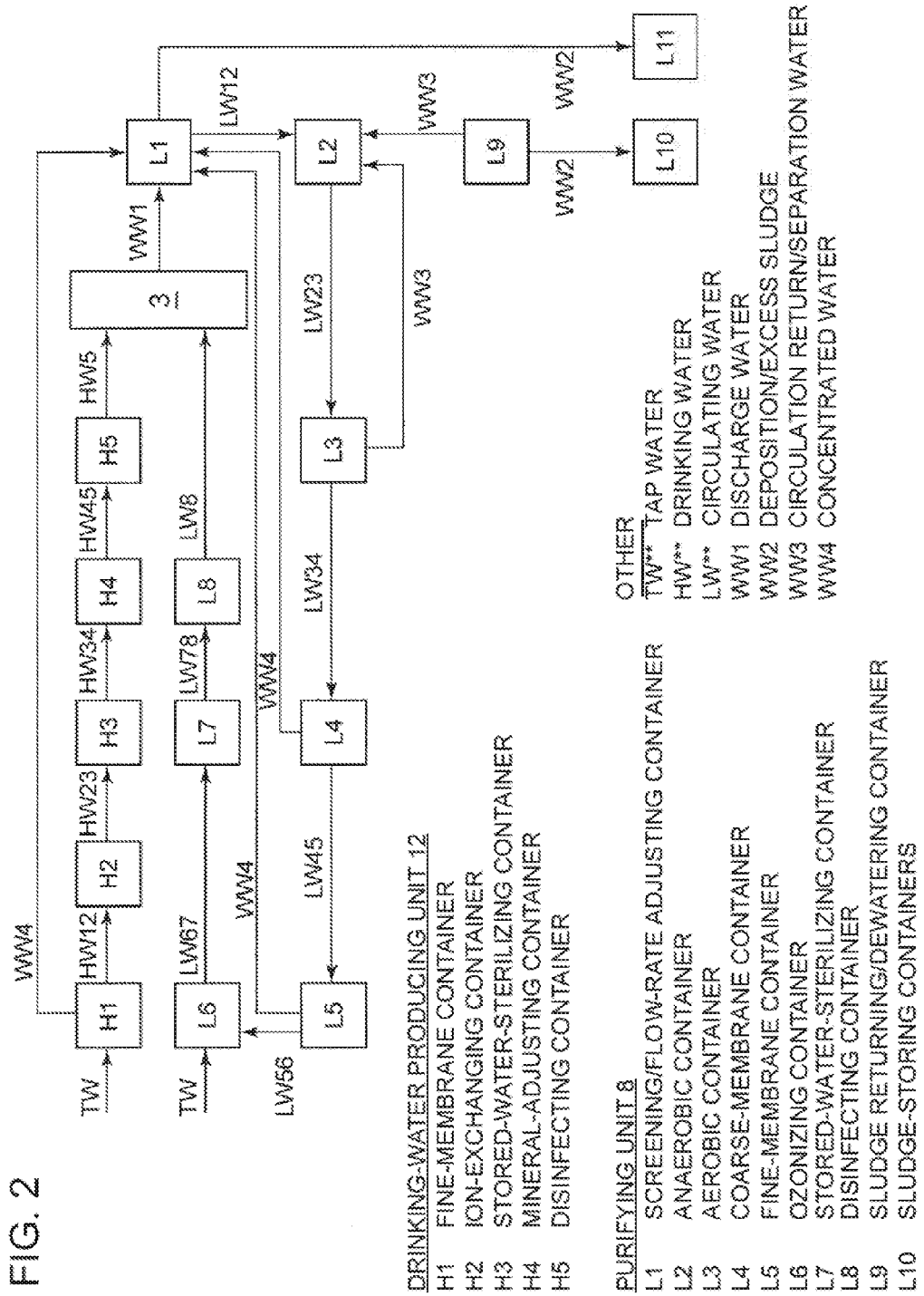
FIG. 2 is a schematic diagram corresponding to the circulating-water utilization system depicted in FIG. 1 showing an example of a layout of treatment vessels of a purifying unit and of a drinking-water producing unit in particular.

FIG. 2 is a schematic diagram corresponding to the circulating-water utilization system depicted in FIG. 1, showing an example of a layout of treatment vessels of a purifying unit and a drinking-water producing unit in particular. In an embodiment illustrated in FIG. 2, the purifying unit 8 comprises a screening/flow-rate-adjusting container L1, an anaerobic container L2, an aerobic container L3, a coarse-membrane container L4, a fine-membrane container L5, an ozonizing container L6, a stored-water-sterilizing container L7, and a disinfecting container L8, connected in series in this order.

The screening/flow-rate-adjusting container L1 is a treatment vessel that removes residue or oil from wastewater, and equipped with an oil trap, a screening device, or the like. The anaerobic container L2 and the aerobic container L3 are treatment vessels for removing organic substances from wastewater by performing an anaerobic treatment and an aerobic treatment. Various known processes may be employed for the treatments, including the A20 activated sludge process, the batch activated sludge process, the contact oxidation process, and the oxidation ditch process, for instance. The coarse-membrane container L4 is a treatment vessel for separating sludge from wastewater. Various devices and processes may be employed, including a settling tank, a MF membrane, a UF membrane, and centrifugal separation, for instance. The fine-membrane container L5 is a treatment vessel for improving the water quality of circulating water to the level of clean water. Various devices and processes may be employed, including a reverse osmosis membrane, activated charcoal, a sand filter, an ozone generator, an ion exchanging device, and a mineral adding device, for instance. The ozonizing container L6 is a treatment vessel for ozonizing purified circulating water. The stored-water-sterilizing container L7 is a treatment vessel for storing purified circulating water temporarily while sterilizing the purified circulating water with ultraviolet or the like. The disinfecting container L8 is a treatment vessel for disinfecting purified circulating water with ultraviolet, chlorine, ozone, or the like.

A sludge-returning/sludge-dewatering container L9 is a treatment vessel for dewatering and drying sludge. Sludge-storing containers L10, L11 are treatment vessels for storing waste produced during sewage treatment. The waste includes, for instance, sludge cake and residue. Excess sludge such as sludge cake stored in the sludge-storing containers L10, 11 are carried out of the system by, for instance, being collected by a fertilizer maker.

Further, in an embodiment illustrated in FIG. 2, the drinking-water producing unit 12 comprises a fine-membrane container H1, an ion-exchanging container H2, a stored-water-sterilizing container H3, a mineral-adjusting container H4, and a disinfecting container H5, connected in series in this order. The fine-membrane container H1, the ion-exchanging container H2, the stored-water-sterilizing container H3, the mineral-adjusting container H4, and the disinfecting container H5 are treatment vessels for further purifying tap water to improve its quality as high as that of mineral waters sold in market.

The fine-membrane container HI includes various devices and processes such as a reverse osmosis membrane, activated charcoal, and a sand filter, for instance. The ion-exchanging container H2 includes an ion-exchanging device, for instance. The stored-water-sterilizing container H3 is a treatment vessel for storing purified tap water temporarily while sterilizing the purified tap water with ultraviolet or the like. The mineral-adjusting container L4 includes a mineral-adding device, for instance. The disinfecting container H5 is a treatment vessel for disinfecting purified tap water with ultraviolet, chlorine, ozone, or the like.

It should be noted that the above described layouts and configurations of the treatment vessels of the purifying unit 8 and the drinking-water producing unit 12 are merely examples, and various modifications may he implemented in accordance with a water quality of wastewater to be discharged or a target purification standard. Further, the reference sign TW in the drawing represents a flow of tap water supplied from a public water works system. Tap water TW may be supplied not only to the drinking-water producing unit 12 as described above, but also to the circulation channel 2 as makeup water if needed. In this case, tap water TW may he supplied at a downstream side of the fine-membrane container L5, where purification of wastewater is nearly completed. Further, the reference sign WW4 in the drawing represents a returning line for feeding concentrated water to the screening/flow-rate-adjusting container L1.

As described above, in the novel circulating-water utilization system 1 being developed by the present applicant, the purifying unit 8 for purifying waste water and the drinking-water producing unit 12 for purifying tap water both comprise container-type treatment vessels which include containers each of which houses a treatment device that performs a treatment step, which is one of three or more treatment steps into which a series of purifying steps is divided. A container-type treatment vessel that performs the first treatment step, a container-type treatment vessel that performs the second treatment step, and a container-type treatment vessel that performs the third treatment step are carried into a site, and connected in series via connection piping, and thereby the purifying unit 8 is constructed. Such a container-type treatment vessel can be loaded onto a truck to be transported as it is, and thus has a high transportability. Further, such a container-type treatment vessel is housed in a container housing removably, and thus can be installed and removed as desired.

With regard to processing capacity, the above container-type treatment vessels are each supposed to be capable of processing wastewater from approximately 1,000 persons. Thus, to introduce the present circulating-water utilization system to an area or a complex inhabited by a population of approximately 10,000, for instance, a plurality of (e.g. ten) treatment vessels that performs the same treatment step is required. With a plurality of treatment vessels that performs the same treatment step provided as described above, it is possible to reduce processing capacity per treatment vessel. Thus, it is possible to flexibly deal with population variation in a target area or seasonal variation of water demand. Further, a substitute treatment vessel can be prepared readily, and maintainability is improved.

Figure 3:
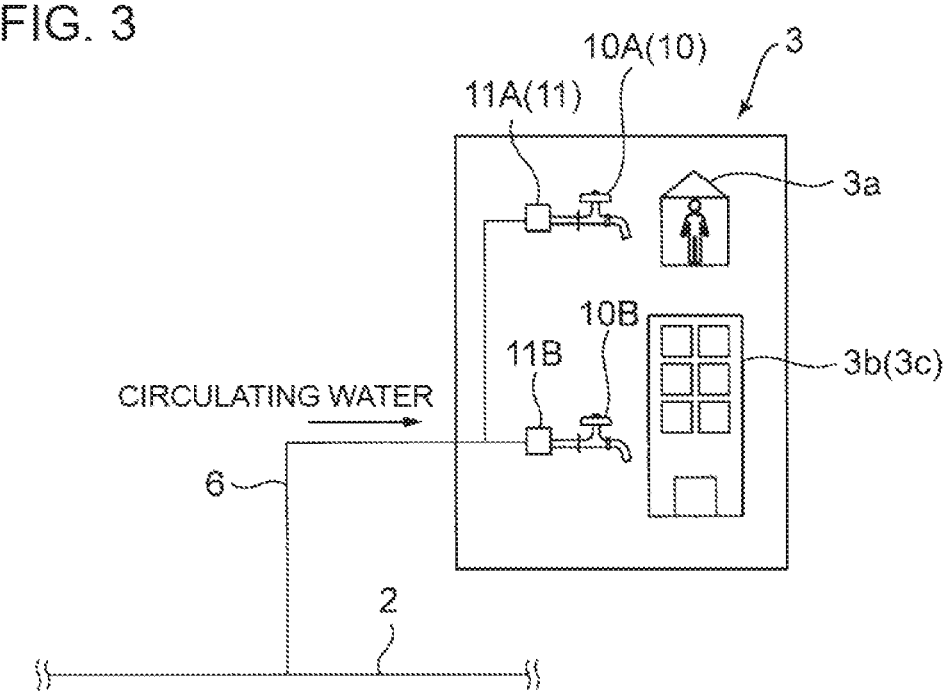
FIG. 3 is a partial schematic diagram of a circulating-water utilization system, for describing an intake part and a sterilizing unit disposed on the intake part.

FIG. 3 is a partial schematic diagram of a circulating-water utilization system for describing an intake part and a sterilizing unit disposed on the intake part.

As depicted in FIG. 3, the circulating-water utilization system 1 of the present embodiment at least comprises an intake part 10 for intake of circulating water from the supply channel 6, and a sterilizing unit 11 for sterilizing circulating water The intake part 10 comprises a variety of devices for intake of circulating water from the supply channel 6, including a tap 10a, and a water distributing pipe 10b for distributing circulating water to the tap 10a from a water reservoir tank 11a described below. The sterilizing unit 11 comprises, for instance, an ultraviolet sterilizing device 11 or a boiling device 11 described below Further, as depicted in FIG. 3, intake parts 10A, 10B are respectively provided for a plurality of water consuming members 3a, 3b. Sterilizing units 11A, 11B are respectively provided for the plurality of intake parts 10A, 10B.

Circulating water is obtained by purifying wastewater, which is sewage, with the purifying unit 8. While the water quality of circulating water is guaranteed to be a predetermined level or higher, some users may feel anxious about the water quality of circulating water.

In this regard, the present circulating-water utilization system 1 comprises the sterilizing unit 11 for sterilizing circulating water disposed on the intake part 10 for intake of circulating water. This sterilizing unit 11 is disposed adjoining to the intake part 10, or integrally with the intake part 10. Thus, it is possible to sterilize circulating water immediately before the plurality of consuming members 3a, 3b, 3c, which are users, uses the circulating water, which makes it possible to enhance users' trust on the circulating water.

Figure 4:
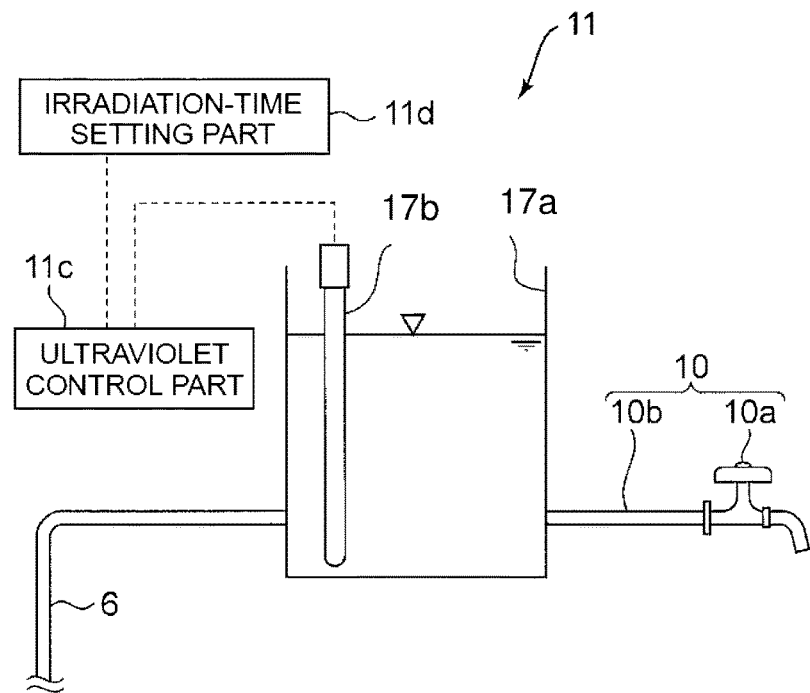
FIG. 4 is a schematic view of a sterilizing unit according to an embodiment.
Figure 5:
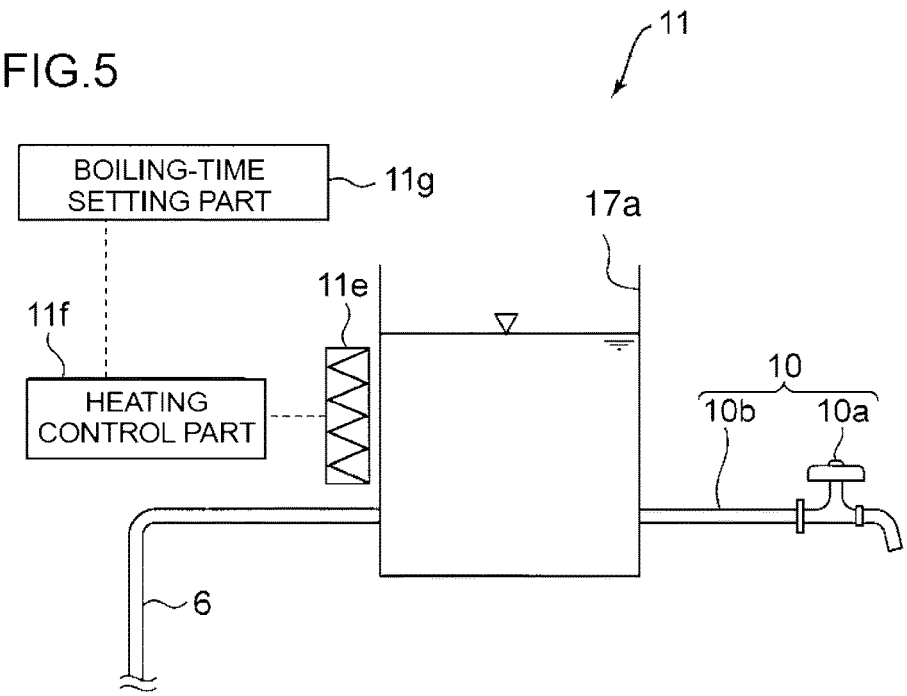
FIG. 5 is a schematic view of a sterilizing unit according to an embodiment.

FIGS. 4 and 5 are each a schematic view of a sterilizing unit according to an embodiment.

In some embodiments, as depicted in FIG. 4, the sterilizing unit ii comprises an ultraviolet sterilizing device 11 configured to sterilize circulating water by irradiating circulating water with ultraviolet. The ultraviolet sterilizing device 11 comprises a water reservoir tank 17a for storing circulating water, an ultraviolet emitting lamp 17b which is disposed inside the water reservoir tank 17a and which irradiates circulating water stored in the reservoir tank with ultraviolet, an ultraviolet control part 11c which controls on and off of the ultraviolet emitting lamp 17b. and an irradiation-time setting part 11d which is capable of setting a duration of ultraviolet irradiation optionally. If a user, for instance, inputs an irradiation time to the irradiation-time setting part 11d, the ultraviolet emitting lamp 17b emits ultraviolet for the length of the inputted irradiation time, thereby sterilizing circulating water stored in the water reservoir tank 17a.

In some embodiments, as depicted in FIG. 5, the sterilizing unit 11 comprises a boiling device 11 configured to sterilize circulating water by boiling. The boiling device 11 comprises a water reservoir tank 17a for storing circulating water, a heating unit 11e configured to heat and boil circulating water stored in the reservoir tank, such as a heater, a heating-control part 11f configured to control operation of the heating unit 11e, and as boiling-time setting part 11g which is capable of setting a duration of boiling optionally. The heating unit 11e may have a structure that is capable of heating the water reservoir tank 17a itself to a higher temperature. The operation of the heating unit 11e is controlled so that, if a user, for instance, inputs a boiling time to the boiling-time setting part 11g, circulating water is boiled for the length of the inputted boiling time.

According to this embodiment, a user himself/herself can set a desired sterilizing time, for instance. A user himself/herself can take part in sterilization of circulating water immediately before using the circulating water and can select a duration of the sterilization optionally as described above, which makes it possible to enhance users' trust on the circulating water.

Further, in the above embodiment, the sterilizing unit 11 may be configured to be capable of setting a processing level of sterilization optionally. A processing level of sterilization herein is determined on the basis of a sterilization time and a sterilization strength representing a strength of sterilization. Specifically, being capable of setting a processing level of sterilization optionally includes not only being capable of setting an optional sterilization time as described above, but also being capable of setting an optional sterilization strength such as a strength of ultraviolet to be emitted and a boiling temperature.

Further, in some embodiments, the above described sterilizing unit 11 is configured to start operation at a preset interval of time to sterilize circulating water.

According to this embodiment, sterilization is performed at a preset interval without a user himself/herself starting the sterilizing unit 11, which makes it possible to further enhance users' trust on circulating water.

Further, in some embodiments, the above described sterilizing unit 11 is configured to sterilize circulating water stored in the water reservoir tank 17a for storing circulating water each time circulating water is supplied to the water reservoir tank 17a.

According to this embodiment, circulating water stored in the water reservoir tank 17a for storing circulating water is sterilized each time circulating water is supplied to the water reservoir tank 17a, without a user starting the sterilizing unit 11 by himself/herself. Thus, it is possible to enhance users' trust on circulating water even further.

FIG. 6 is a schematic cross-sectional view of a supply pipe and a recirculation channel according to an embodiment.

Figure 6A:
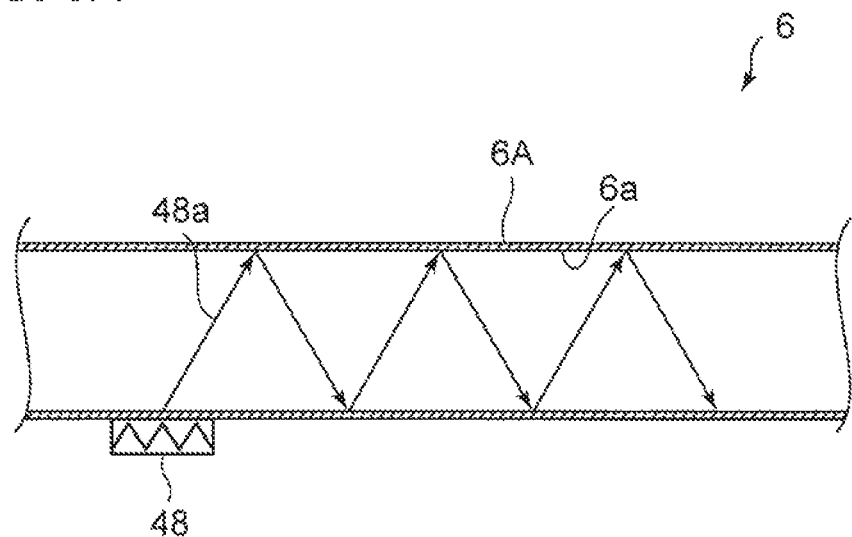
FIG. 6 is a schematic cross-sectional view of a supply pipe and a circulation channel according to an embodiment.

In some embodiments, as illustrated in FIG. 6A, the supply channel 6 comprises a supply pipe 6A which constitutes at least a part of the supply channel 6 and has an inner wail 6a which is mirror-finished, and an ultraviolet emitting unit 48 disposed in the supply pipe 6A to emit ultraviolet 48a into the supply pipe 6A. The ultraviolet emitting unit 48 may comprise, for instance, an ultraviolet emitting lamp 48 from among various known types that can be disposed in piping.

According to this embodiment, ultraviolet is emitted into the supply pipe 6A, and the inner wall 6a obtained by mirror finish is utilized to diffusely reflect ultraviolet inside the supply pipe 6A, which makes it possible to sterilize circulating water flowing through the supply pipe 6A.

At this time, if the supply channel 6 is entirely composed of the supply pipe 5A with a mirror-finished inner wall, it is possible to perform sterilization m the entire supply channel 6. Further, if a plurality of the ultraviolet emitting units 48 is disposed at predetermined intervals in the supply pipe 6A, it is possible to perform sterilization more efficiently in the supply pipe 6A.

Figure 6B:
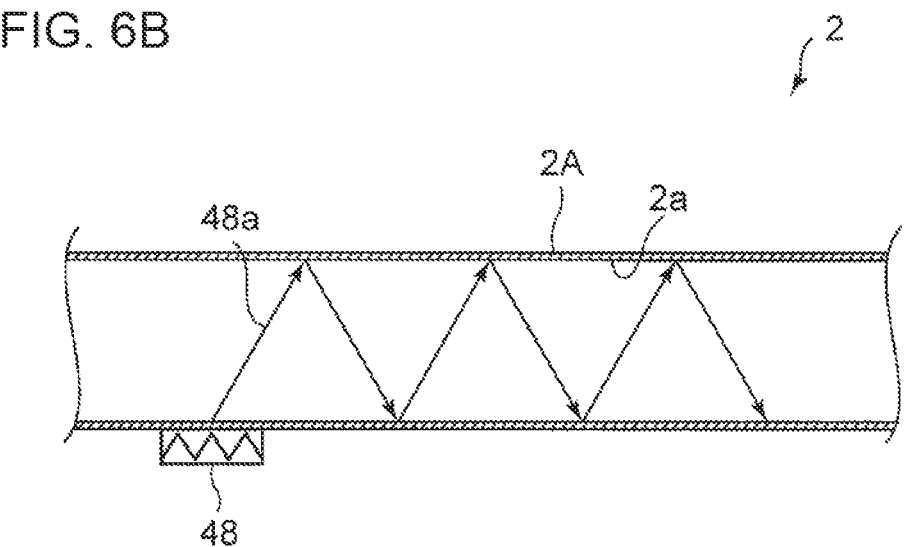

Further, in some embodiments, as illustrated in FIG. 6B, the circulation channel 2 comprises a circulation pipe 2A which constitutes at least a part of the circulation channel 2 at a downstream side of the purifying unit 8 and an upstream side of a connecting position at which the circulation channel 2 is connected to the supply pipe 5 and which has an inner wall 2a which is mirror-finished, and an ultraviolet emitting unit 48 disposed in the circulation pipe 2A to emit ultraviolet 48a into the circulation pipe 2A.

According to this embodiment, ultraviolet is emitted into the circulation pipe 2A. and the inner wall 2a obtained by mirror finish is utilized to diffusely reflect ultraviolet inside the circulation pipe 2A, which makes it possible to sterilize circulating water purified by the purifying unit 8 and flowing through the circulation pipe 2A.

At this time, if the circulation channel 2 is composed of the circulation pipe 2A with a mirror-finished inner wall entirely in a section at the downstream side of the purifying unit 8 and the upstream side of the connection position to the supply pipe 6, it is possible to perform sterilization in the entire circulation channel 2. Further, if a plurality of the ultraviolet emitting units 48 is disposed at predetermined intervals in the circulation pipe 2A, it is possible to perform sterilization more efficiently in the circulation pipe 2A.

The embodiments of the present invention have been described above. However, the present invention is not limited thereto. For instance, various modifications may be applied as long as they do not depart from the object of the present invention.

INDUSTRIAL APPLICABILITY

At least one embodiment of the present invention can be suitably applied as a circulating-water utilization system to he constructed in a specific area separately from a public waterworks system.

DESCRIPTION OF REFERENCE NUMERALS

1 Circulating-water utilization system
2 Circulation channel
2A Circulation pipe
3 Water consumer
3a Residence
3b Tenant shop
3c Office
4 Discharge channel
6 Supply channel
6A Supply pipe
8 Purifying unit
10 Intake part
10a Tap
10b Water distribution channel
11 Sterilizing unit (ultraviolet sterilizing device, boiling device)
11a Water reservoir tank
11b Ultraviolet emitting lamp
11c Ultraviolet control part
11d Irradiation-time setting part
11e Heating unit 11*f* Heating-control part
11*g* Boiling-time setting part
12 Drinking-water producing unit
14 Drinking-water supply unit
14*a* Drinking-water feeding channel
14*b* Reservoir tank, drinking-water tank
14*c* Drinking-water channel
16 Tap-water introduction channel
48 Ultraviolet emitting unit (ultraviolet emitting lamp)

The invention claimed is:

1. A circulating-water utilization system, at least comprising:
a circulation channel through which circulating water flows;
a discharge channel through which wastewater discharged from a water consumer is discharged to the circulation channel, the water consumer being composed of a plurality of water consuming members including at least one of a residence, a tenant shop, or an office which uses the circulating water flowing through the circulating channel;
a purifying unit configured to purify the circulating water containing the wastewater flowing through the circulation channel;
a supply channel configured to supply the circulating water purified by the purifying unit to the water consumer;
a plurality of water intake parts for intake of the circulating water from the supply channel, the water intake parts being disposed on the respective water consuming members; and
a plurality of sterilizing units disposed on the respective water intake parts, and configured to individually sterilize the circulating water to be supplied to the respective water consuming members,
wherein the sterilizing units are configured to be capable of optionally setting a processing level of sterilization.

2. The circulating-water utilization system according to claim 1,
wherein the sterilizing units comprise an ultraviolet sterilizing device including an ultraviolet emitting lamp configured to irradiate the circulating water with ultraviolet, and an irradiation-time setting part capable of optionally setting a duration for which the ultraviolet emitting lamp emits ultraviolet.

3. The circulating-water utilization system according to claim 1,
wherein the sterilizing units comprise a boiling device including a heating unit configured to heat and boil the circulating water, and a boiling-time setting part capable of optionally setting a boiling time by the heating unit.

4. The circulating-water utilization system according to claim 1,
wherein the sterilizing units are configured to start operation at a predetermined time interval to sterilize the circulating water.

5. The circulating-water utilization system according to claim 1,
wherein the sterilizing units comprise a water storage tank configured to store the circulating water, and are configured to sterilize the circulating water stored in the water storage tank each time the water storage tank is supplied with the circulating water.

6. The circulating-water utilization system according to claim 1,
wherein the supply channel comprises:
a supply pipe constituting at least a part of the supply channel and having an inner wall which is mirror-finished; and
an ultraviolet emitting unit configured to emit ultraviolet into the supply pipe.

7. The circulating-water utilization system according to claim 1,
wherein the circulation channel comprises:
a circulation pipe constituting at least a part of the circulation channel at a downstream side of the purifying unit and at an upstream side of a connection position at which the circulation channel is connected to the supply pipe and having an inner wall which is minor-finished; and
an ultraviolet emitting unit configured to emit ultraviolet into the circulation pipe.

* * * * *